March 27, 1962 A. HESS ET AL 3,027,144
SEAL FOR ROTARY REGENERATOR
Filed July 23, 1958 3 Sheets-Sheet 1

Inventors
Anton Hess
Benjamin Barish

By [signature] Attys

March 27, 1962   A. HESS ET AL   3,027,144
SEAL FOR ROTARY REGENERATOR
Filed July 23, 1958   3 Sheets-Sheet 2

Inventors
Anton Hess
Benjamin Barish
By Hill, Sherman, Meroni, Gross
Attys

March 27, 1962  A. HESS ET AL  3,027,144
SEAL FOR ROTARY REGENERATOR
Filed July 23, 1958  3 Sheets-Sheet 3
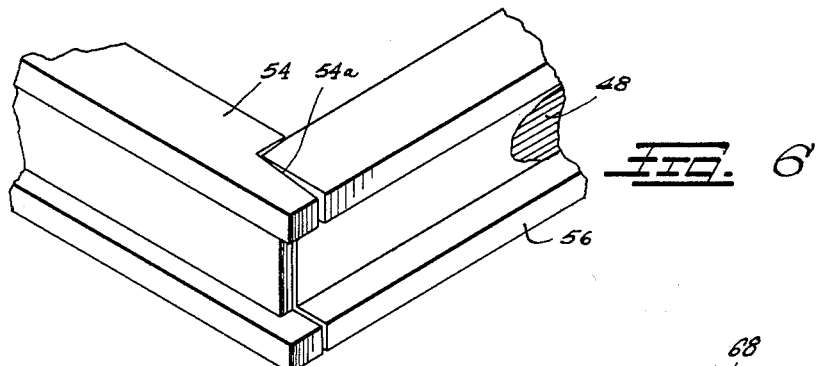
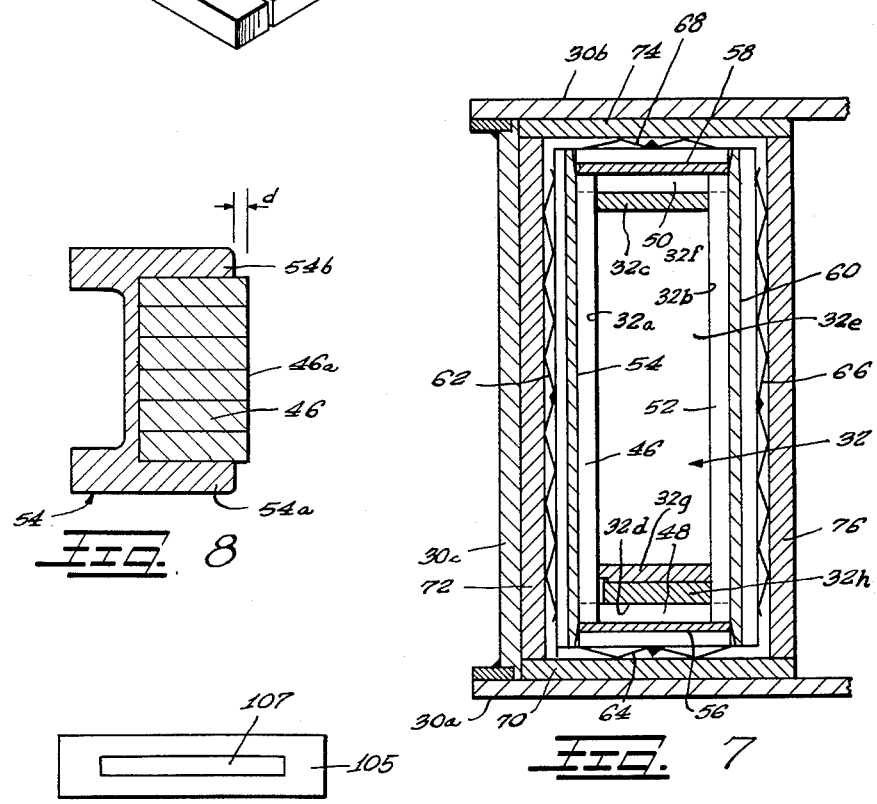
Inventors
Anton Hess
Benjamin Barish

United States Patent Office 3,027,144
Patented Mar. 27, 1962

3,027,144
SEAL FOR ROTARY REGENERATOR
Anton Hess, Parma, and Benjamin Barish, Lyndhurst, Ohio, assignors to Thompson Ramo Wooldridge Inc., a corporation of Ohio
Filed July 23, 1958, Ser. No. 750,515
9 Claims. (Cl. 257—269)

The present invention relates to improvements in rotary regenerator assemblies for use with gas turbines, and more particularly deals with seals for a rotating regenerator drum which prevent the flow of air or gas around the periphery of the drum where the drum rotates through a dividing chamber wall.

The invention contemplates use with a gas turbine assembly having a ring-like rotary regenerator drum to absorb exhaust gas heat and to deliver this heat to air being supplied to the turbine. The turbine is provided with a compressor which delivers compressed air to a combustor with the combustor supplying a flow of hot gases for operating the turbine. A rotary regenerator is provided intercepting the flow of exhaust gases from the turbine and positioned between the compressor and combustor to heat the compressed air. The regenerator is provided with a housing having a partition separating the housing into a chamber for the exhaust gases and a chamber for the compressed air. The rotating matrix drum passes through the partition through the chambers and a seal prevents the escape of compressed air past the matrix to the low pressure exhaust chamber.

A feature of the invention is the provision of a seal for sealing the peripheral surfaces of an annular rotating regenerator drum. The seal receives the ring-like drum therethrough and prevents the escape of gases past the peripheral surface of the drum. The seal employs sets of parallel stacked strips in edgewise engagement with the peripheral surfaces of the drum. The stacks of strips are interspersed or stacked in an overlapping manner at their corners and urged toward the drum to shift and conform to the drum surface for an improved seal. The sealing strips are sandwiched between retainer plates which are harder than the sealing strips, so that the sealing strips will wear down until the retainer plates engage the drum. In another form, a clearance control means controls the position of the sealing strips. Improved means are provided for containing and supporting the seal and for cooling it during operation.

An object of the invention is to provide an improved rotary regenerator construction with improved performance characteristics.

A further object of the invention is to provide an improved seal construction for a rotary regenerator which will prevent the flow of compressed air in an air chamber of the regenerator to the exhaust chamber of the regenerator which will retain its sealing properties during operation with rotation of the regenerator drum.

Another object of the invention is to provide an improved seal for a rotary regenerator drum which is capable of compensating for the severe effects of temperature change on the regenerator parts.

Other objects and advantages will become more apparent with the teachings of the principles of the invention in connection with the showing and disclosure thereof, in the specification, claims and drawings, in which:

FIGURE 6 is a perspective view illustrating the relationship between the retainers for sealing strips for adjacent sides of the matrix drum;

FIGURE 7 is a sectional view taken through the seal substantially along line VII—VII of FIGURE 2;

FIGURE 8 is a sectional view taken through a seal and retainer before they are "worn in"; and, FIGURE 9 is a sectional view taken substantially along line IX—IX of FIGURE 5.

As shown on the drawings:

Figure 1:
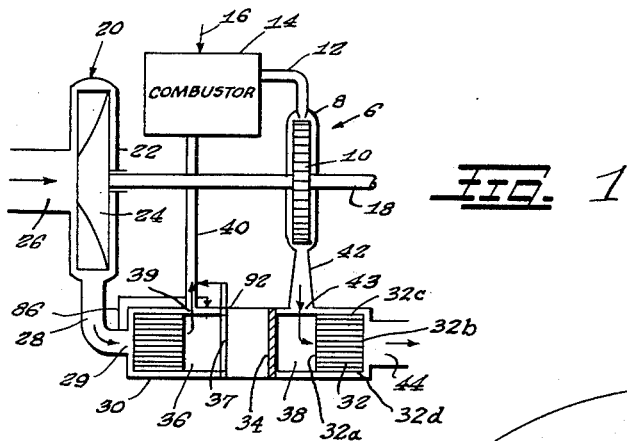
FIGURE 1 is an elevational view shown in schematic form of a turbine assembly employing a rotary regenerator.

FIGURE 1 illustrates a turbine assembly having a turbine section 6 with a turbine housing 8 and a turbine rotor 10 therein. The housing is provided with a gas inlet 12 supplied from a combustor 14 which is provided with fuel at 16. The turbine rotor is mounted on a shaft 18 which is suitably supported on bearings in the turbine housing 8, and which drives a compressor 20. The compressor has a housing 22 with a compressor rotor 24 therein. The compressor rotor is secured to the shaft 18 and draws air through an inlet 26 in the housing 22. The compressed air is delivered from the volute-shaped chamber of the housing 22 through a compressed air discharge conduit 28, which connects to a regenerator housing 30.

Figure 2:
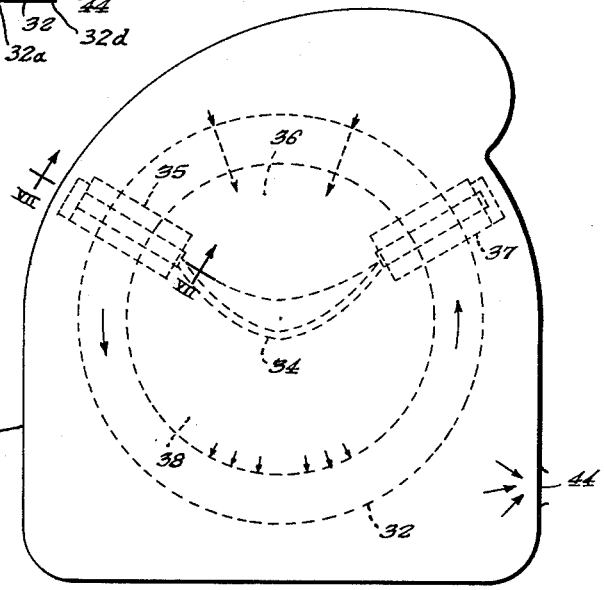
FIGURE 2 is a plan view of the housing for a regenerator embodying the principles of the present invention and illustrating the position of the various parts therein.

Within the regenerator housing 30 is a rotary annular shaped drum or matrix assembly 32, FIGS. 1 and 2. The matrix drum provides gas flow passages for the exhaust gas from the turbine and for the compressed air flow from the compressor with the same passages alternately accommodating the flow of gas and air as the matrix assembly is rotated within the housing 30, as will be appreciated by those skilled in the art. The housing 30 is provided with a partition 34 dividing the housing into a compartment 36 for compressed air and a compartment 38 for exhaust gases. The partition is provided with suitable seals such as 35 and 37, FIGURES 1 and 2, which will be described in detail later and which prevent the escape of air past the partition and the matrix drum from the high pressure air compartment 36 to the lower pressure exhaust compartment 38.

Compressed air flows radially through the matrix assembly 32 from the compressed air conduit 28 through a regenerator housing inlet 29, and out through a regenerator housing outlet 39, through a conduit 40 leading to the combustor. Exhaust gas from the turbine flows radially outwardly through the matrix assembly from an exhaust conduit 42 through an exhaust inlet port 43 leading into the regenerator housing, and out through an exhaust outlet port 44, leading from the regenerator housing.

The matrix assembly consists generally of an annularly shaped drum which is rectangular in cross section as illustrated in FIGURES 1, 2, 4 and 5. The drum is rotated and passes through the partition 34 to move through both the high pressure chamber 36 and the low pressure chamber 38 with the seal 37 being designated as the leading seal assembly with the seal 35 as the trailing seal assembly, FIGURE 2. As illustrated particularly in the form shown in FIGURES 1 and 7, the seal provides sealing surfaces which engage the flat upper and lower and the side annular surfaces of the matrix drum 32, and which particularly prevent the flow of gas past these surfaces of the matrix and past the corners where the surfaces join. The side curved side surfaces of the drum 32 are shown at 32a and 32b, and the upper and lower surfaces at 32c and 32d. The drum 32, as illustrated in FIGURE 7, has an annular center matrix portion 32e with radial gas passages, and the matrix portion is sandwiched between an upper flat ring 32f and a lower flat ring 32g. Beneath the lower ring 32g is a ring gear 32h for driving the matrix drum in rotation.

Figure 3A:
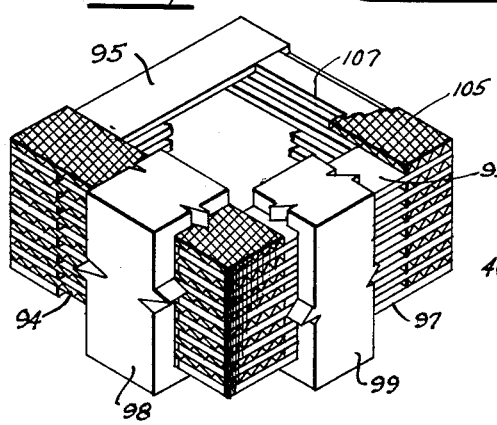
FIGURE 3a and 5 are views similar to FIGURES 3 and 4, but showing another embodiment of the invention.
Figure 3:
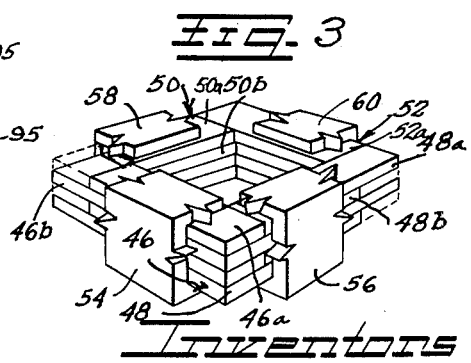
FIGURE 3 is a detailed perspective view of the elements of the seal and their assembled relationship.

The seal, FIGURES 3 and 7, is formed of a series or a stack of flat strips 46 which are in edgewise engagement with the outer peripheral surface 32a of the matrix drum. For the adjoining flat end face 32d of the drum another stack or series of flat strips 48 are provided. For the opposite flat end face 32c of the drum, another series or stack of flat strips 50 is provided and for the inner peripheral surface 32b of the drum, still another series or stack of strips 52 is provided.

Each of the strips in the stacks engages or is in sealing or facing relationship to the adjacent drum surface with the edge of the strip and with the edges being lateral of adjacent strips of the same stack. The strips are joined at their corners in an overlapped interfingered manner, so that corner seal joints are provided. The strips are flat surfaced and smooth, and can shift relative to each other, so as to conform to the surface of the regenerator drum, and thus form an improved seal. As illustrated in FIGURE 3, fewer number of strips are shown in the seal illustrated in FIGURE 2 than in FIGURE 4 for clarifying the view. The outer strip 46a is shifted longitudinally with respect to its stack to extend into the stack of strips 48.

The outer strip 48a is shifted longitudinally to permit the end of strip 46a to overlap the end of the next strip 48b beneath strip 48a. Similarly, the shifted strip 48a extends into the stack of strips 52 and strip 52a is shifted longitudinally to extend into the stack of strips 50 and to overlap the strip 50b. Strip 50a is shifted to overlap the strip 46b. Alternate strips of each stack are shifted longitudinally to extend into the adjoining stack and form the seal to surround the annular drum, as illustrated in FIGURES 3 and 7.

As a preferred form of material, talc is used for the strips, which is sufficiently soft to "wear in" against the drum surface.

The stacks of strips are held by retainers with a retainer 54 being shown for the strips 46, a retainer 56 for the strips 48, a retainer 58 for the strips 50, and a retainer 60 for the strips 52.

The retainers are C-shaped and have side plates such as 54a and 54b for the retainer 54 to hold the stacked strips 46 therebetween. Inasmuch as each of the retainers has a substantially identical construction, only one need be described in detail.

The side plates 54a and 54b are made of a harder material than the stacked sealing strips 46. For example, with the strips 46 being formed of talc, the retainer plates are formed of a bronze or high temperature resinous material that is not necessarily hard, but is tough. Retainer plates absorb all static and shock loads and thereby prevent fracturing or chipping of the talc portion of the seal. It will be noted that the talc strips are of a size to project beyond the retainer side plates for a distance d, as shown in the sub-assembly of FIGURE 8. Thus, during first operation of the regenerator, the sealing strips will wear in and their edge surfaces 46a will wear down until the edge surfaces of the sides 54a and 54b engage the surface of the regenerator drum 32. The harder retainer sides will reduce the wear rate, and a conforming tight-sealing surface results. The retainer sides 54a and 54b form in effect clearance control means for the strips 46 since their contact surface with the matrix is the supporting and wearing surface. As will be appreciated and recognized by those skilled in the art, once the sealing strip has worn down so that the retainer sides are in engagement with the drum, the sealing strips will be in barely touching or facing contact with the matrix with substantially zero pressure. It is further likely as will be recognized by those skilled in the art, that the particles wearing from the softer strips will etch away the edges of the strips so that there will be an extremely small finite distance between the strips and the matrix providing a good sealing relationship.

A light pressure is applied against the seals, such as by springs 62, 64, 66 and 68 which urge the retainers inwardly and are backed against holding plates 70, 72, 74 and 76. The lower and upper holding plates 70 and 74 rest against the lower and upper parts 30a and 30b of the housing shell. The outer plate 72 is supported inside the outer part 30c of the housing shell, and the plate 76 is supported at its ends, as shown in FIGURE 7.

The matrix drum 32 has a matrix 32a which has a plurality of radial gas flow passages and is formed of a material which becomes heated when hot turbine gas flows therethrough and gives up heat to the air when cool air flows therethrough. The matrix is bounded on the bottom and top by annular rings 32b and 32c. A ring gear 32d is provided for rotating the drum 32.

Figure 4:
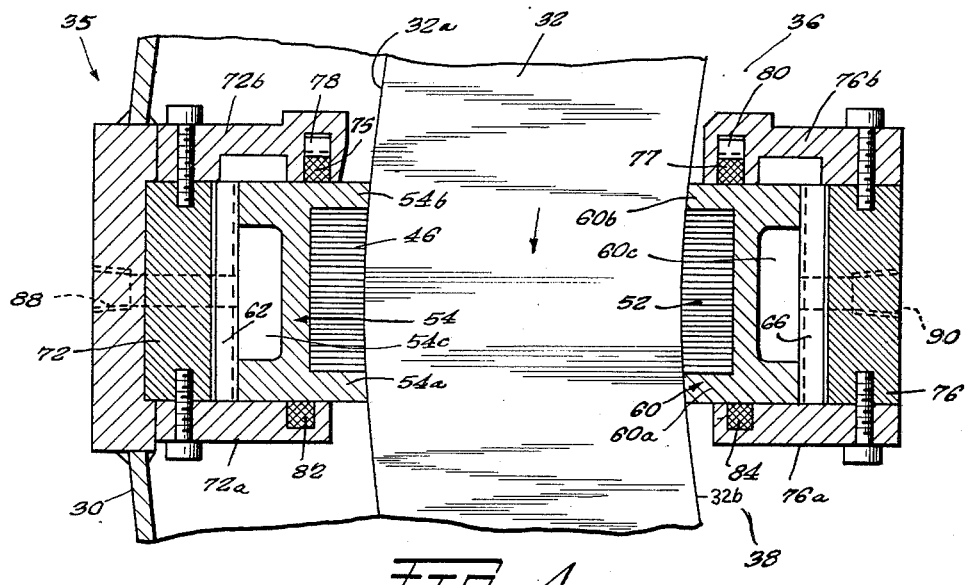
FIGURE 4 is a sectional view taken through the seal in the regenerator housing.

At the sides of the holding plates, particularly as shown in FIGURE 4, for holding plates 72 and 76, are side holding plates 72a and 72b for the plate 72, and 76a and 76b for the plate 76. The side holding plates are suitably held to the holding plates, such as by bolts. The plates 72b and 76b are on the high pressure air side of the housing, or face the chamber 36. The holder sides are provided with grooves for carrying seals 75 and 77 which are urged against the retainer sides 54b and 52b by springs 78 and 80 to prevent the escape of compressed air between the holder sides 72b and 76b and the retainer sides 54b and 60b.

On the other side of the seal, sealing strips 82 and 84 are positioned between the holder sides 72a and 76a, and the retainer plates 54a and 60a.

The sealing assemblies are air-cooled. As shown in FIGURE 1, for this purpose, a bleeder line 86 bleeds a small portion of compressed air from the compressor conduit 28 and directs it to a cooling air inlet 88 in the seal assembly. The inlet opens into a hollow channel 54c formed at the back of the retainer 54. The cooling air flows through the channel and through similar channels provided in the retainers 56 and 58 below and above the seal assembly and down through a channel 60c in the retainer 60, where it flows through a cooling air outlet 90 to a return bleed line 92, which connects to the conduit 40 leading to the combustor. Thus, a continuous flow of cooling air is maintained with the provision of a minimum amount of extra equipment. The relationship at the corners of the retainers is illustrated in FIGURE 6, where retainer 54 joins retainer 56. The sealing strips 46, held by the retainer 54, and the sealing strips 48, held by the retainer 56, join in overlapping relationship, and the retainer 54 is cut away at 54a so that the retainer 56 can project into the sides thereof. A slight freedom between the joints is provided to accommodate for wear on the faces of the edges of the retainer after the sealing strips are worn down.

Figure 5:
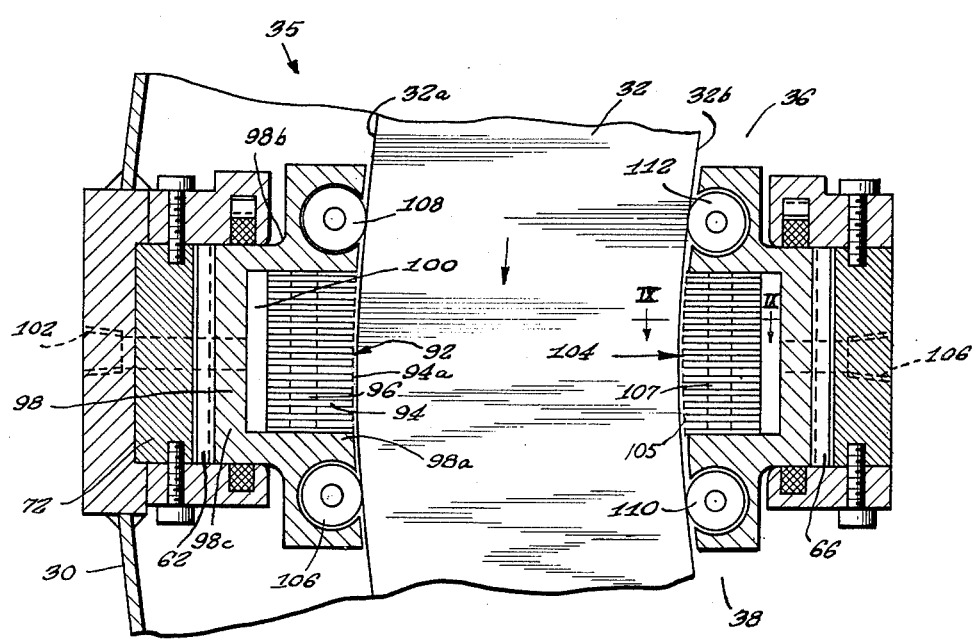

Another form of the seal assembly is illustrated in FIGURES 3a and 5. Certain parts of the seal assembly are the same as the embodiment shown in FIGURES 1, 3 and 7, and like parts are given like numbers.

A seal assembly 92 is provided with stacked strips 94. The strips 94 are flat surfaced and in stacked aligned relationship with their edges 94a facing and just adjacent to the outer curved surface 32a of the regenerator drum, but preferably not in actual rubbing contact therewith. Of course they may be in barely touching contact as with the arrangement of FIGURE 4. The opposite curved surface 32b of the drum is sealed by flat strips 105. The upper flat surface 32c of the drum is sealed by strips 95 and the lower flat surface 32d by flat strips 97.

The strips are sufficiently long to extend into the adjoining stack and the strips of each stack are spaced to admit strips of the adjacent stack between them at their ends.

To space the strips, spacers are provided between the flat strips of each set of strips 94, 95, 97, and 107, which are of a size to cover less than the total area of the strips, as shown by the spacer 107 and strip 105 in FIGURE 9. As shown, the spacers terminate inwardly from the sides and ends of the strips to provide exposed marginal faces on the strips. The exposed end marginal faces received in mated sealing relation, the strips of adjoining stacks, and this arrangement avoids the necessity for the laternating longitudinally offset strips in the stacks 46, 48, 50 and 52, FIGURES 3 and 8, provide the solid seal barrier. The spacers such as 96 for the strips 94, or 107 for the strips 105, FIGURE 3a are preferably welded to each of the adjoining strips to form a composite stack.

Each stack of strips is held by a retainer. Strips 94 have a retainer 98 having retainer sides 98a and 98b with a retainer back 98c so as to be C-shaped, as illustrated in FIGURE 5. Strips 97 have a retainer 99, FIGURE 3a.

The stacked strips 94, FIGURE 5, are secured between the sides 98a and 98b so as to provide a cooling air space 100 between the back 98c of the retainer and the strips. Cooling air is supplied through this space through an inlet 102 supplied with cooling air such as from the compressor. For the seal assembly 104 at the other side of the regenerator drum, the air is discharged through an outlet line 106. Since the seal 104 is constructed substantially identical to the seal 92, only one need be described in detail. It will also be understood that similar seal assemblies are provided to seal the flat drum surfaces.

The sealing strips 92 and the spacers are preferably formed of a heat resistant metal base alloy such as Inconel.

A clearance control means is provided for the seal, shown in the form of cylindrical rollers 106 and 108 which bear against the outer surface 32a of the regenerator drum. The rollers are carried in projections on the sides 98a and 98b of the retainer, and control the space between the retainer and the seal 94, and the regenerator drum. Similar rollers 110 and 112 control the space of the seal 104 relative to the inner surface 32b of the regenerator drum 32.

In operation of the embodiment of FIGURES 1 through 4, compressed air flows from the compressor 20 through the high pressure chamber 36 of the regenerator and turbine exhaust flows from the turbine 6 through the low pressure chamber 38 of the regenerator. The rotating matrix drum 32 with its radial openings provides heat transfer passages for regenerating operation. The seal assemblies which include the stack of sealing strips 46, 48 and 50 are held in edge engagement with the surfaces of the drum to prevent the escape of compressed air to the chamber for turbine exhaust. A flow of cooling air maintains the seals at a reduced temperature.

While the seals are held individually with a light pressure against the surface of the regenerator drum and move independently because of the interlapping sliding engagement at the corners, and are held in engagement with a spring, and in some circumstances it is contemplated that air pressure may be used for holding the sealing engagement. To accomplish this, the chambers shown holding the springs could be pressurized, for example.

Thus, it will be seen that we have provided an improved rotary regenerator with a seal which prevents the escape of compressed air, and which meets the objectives and advantages hereinbefore set forth. The seal structure accommodates the severe effects of temperature change and accommodates a distortion effect on the seals and on the matrix with temperature change.

We have, in the drawings, and specification, presented a detailed disclosure of the preferred embodiments of our invention, and it is to be understood that we do not intend to limit the invention to the specific form disclosed, but intend to cover all modifications, changes and alternative constructions and methods falling within the scope of the principles taught by our invention.

We claim as our invention:

1. A regenerator for a gas turbine comprising a housing divided into chambers and having inlet and outlet passages for the chambers, a rotary drum-shaped matrix mounted within the housing for rotation through the chambers, and a seal positioned between chambers, and in engagement with the matrix to prevent leakage of gas between chambers including a first series of stacked layers of sealing strips with edges in sealing relationship with a face of said matrix, and a second series of stacked sealing strips with edges in sealing relationship with an adjacent face of said matrix, said first and second series being in overlapping relationship with individual strips of one series extending between the strips of the other series to form a joint between said first and second series at the juncture of said matrix faces.

2. A seal for preventing leakage of gas past the flat surfaces and corners of a rotating matrix from a high pressure chamber to a low pressure chamber through which the matrix passes comprising a first series of stacked layers of sealing strips in edge engagement with a face of said matrix, a second series of stacked sealing strips in edge engagement with an adjacent face of said matrix, said first and second series stacked in overlapping relationship with individual strips of the first series extending between strips of the second series to form a joint between said first and second series at the juncture of said matrix faces, and means for holding said strips in engagement with the matrix.

3. A regenerator assembly for a gas turbine comprising means defining separate chambers for the flow of air and for the flow of gas and provided with inlet and outlet passages for each chamber, a rotary matrix positioned to rotate through said chambers, said matrix being annular in shape and having annular inner and outer surfaces and flat upper and lower surfaces, and a seal for the matrix between the chambers preventing the leakage of gas therebetween, said seal including separate adjacent stacks of flat radially extending strips positioned with the edges of the strips facing the surfaces of the matrix to be sealed, individual strips of one of said stacks extending between strips of another stack at the corner of adjoining surfaces of the matrix.

4. A regenerator assembly comprising a rotary regenerator drum having internal passages for the flow of gas and having outer surfaces, a housing for the regenerator drum having gas chambers through which the drum is rotated and in which gas flows through said drum passages to heat the passages or to receive heat from the material of the drum, a first stack of strips positioned with the edges facing a first surface of the drum to prevent the flow of gas over the drum surface past the strips, and a second stack of strips positioned with the edges facing a second drum surface adjoining said first surface and with at least some of the ends of the strips of the second stack extending between strips at the end of the first stack.

5. A regenerator assembly comprising a rotary regenerator drum having internal passages for the flow of gas and having outer surfaces, a housing for the regenerator drum having gas chambers through which the drum is rotated and in which gas flows through said drum passages to heat the passages or to receive heat from the material of the drum, a first stack of strips positioned with the edges facing a first surface of the drum to prevent the flow of gas over the drum surface past the strips, first spacers between each pair of adjoining strips of a length less than the length of the strips to leave spaces at the end between the strips, a second stack of strips facing another adjacent surface of the drum and extending between the ends of said first strips and against the ends of said first spacers, and second spacers between each pair of adjoining strips of said second stack and extending against the ends of said first strips to form solid stacks of strips and spacers.

6. A seal assembly for preventing leakage of gas past flat surfaces on a rotating matrix for a rotary regenerator from a high pressure chamber to a low pressure chamber through which the matrix passes comprising a first series of parallel spaced sealing strips for positioning with their edges in close sealing relationship to a first surface of the rotating matrix, a second series of spaced sealing strips in parallel relationship extending at an angle to the first series to be positioned with their edges in close sealing relationship to a matrix surface adjacent said first surface and positioned with the ends of the second series of strips interspersed with the ends of the first series of strips, first spacer members interspersed between said first strips and having an area less than the cross sectional area of said first series of strips, a second series of spacer members interspersed between said second series of strips and having an area less than the cross sectional area of said second series of strips, and means securing each said series of strips together with the spacer members therebetween for forming a seal for adjacent surfaces at the corner of the rotating matrix.

7. A regenerator assembly for a gas turbine comprising means defining separate chambers for the flow of air and the flow of gas and provided with inlet and outlet passages for each chamber, a rotary matrix positioned to rotate through said chambers, said matrix being annular in shape and having annular inner and outer surfaces and flat upper and lower surfaces, and a seal for the matrix between the chambers preventing the leakage of gas therebetween, said seal including separate adjacent stacks of flat radially and axially extending strips positioned with the edges of the strips facing the surfaces of the matrix to be sealed and with a stack for each of said surfaces, individual strips of one stack extending between strips of an adjacent stack at the corners of adjoining surfaces of the matrix, and means for separately urging each stack of strips toward the matrix.

8. A regenerator assembly comprising a rotary regenerator drum having internal passages for the flow of gas and having outer surfaces, a housing for the regenerator drum having gas and air chambers accommodating the flow of heated gas and air through said drum passages to heat the passages and to receive heat from the material of the drum respectively, a first stack of strips positioned with the edges facing a first surface of the drum to prevent the flow of gas along the drum surface past the strips with the ends of alternate strips of the first stack longitudinally offset to leave alternate spaces at the end of the stack, and a second stack of strips positioned with the edges facing a second drum surface adjoining said first drum surface and having alternate strip ends projecting said spaces at the end of said first stack to fill said alternate spaces.

9. A regenerator for a gas turbine comprising a housing divided into chambers and having inlet and outlet passages for the chambers, a rotary drum-shaped matrix mounted within the housing for rotation through the chambers, a first series of stacked sealing strips having adjacent sliding surfaces in edge engagement with a face of said matrix, a second series of stacked sealing strips similar to said first series with ends of individual strips extending between the strips of the first series and having edges in sealing engagement with a face of the matrix, said sealing strips of said second series formed of talc whereby they will wear to conform to the surface of the matrix and will slide relative to the strips of the first series, and means for holding said strips in engagement with the matrix.

References Cited in the file of this patent
UNITED STATES PATENTS

| | | |
|---|---|---|
| 2,643,097 | Bowden et al. | June 23, 1953 |
| 2,743,945 | Bentele et al. | May 1, 1956 |
| 2,747,843 | Cox et al. | May 29, 1956 |
| 2,836,398 | Linderoth | May 27, 1958 |
| 2,888,248 | Bubniak et al. | May 26, 1959 |

FOREIGN PATENTS

| | | |
|---|---|---|
| 634,627 | Great Britain | Mar. 22, 1950 |
| 679,169 | Great Britain | Sept. 17, 1952 |